(12) United States Patent
Price

(10) Patent No.: US 11,414,181 B2
(45) Date of Patent: Aug. 16, 2022

(54) AIRCRAFT LANDING GEAR ASSEMBLY

(71) Applicant: SAFRAN LANDING SYSTEMS UK LTD, Gloucester (GB)

(72) Inventor: Neil Richard Price, Gloucester (GB)

(73) Assignee: Safran Landing System UK LTD

(*) Notice: Subject to any disclaimer, the term of this patent is extended or adjusted under 35 U.S.C. 154(b) by 351 days.

(21) Appl. No.: 16/221,948

(22) Filed: Dec. 17, 2018

(65) Prior Publication Data

US 2019/0185145 A1   Jun. 20, 2019

(30) Foreign Application Priority Data

Dec. 18, 2017  (EP) .................................... 17208258

(51) Int. Cl.
| | | |
|---|---|---|
| *B64C 25/22* | (2006.01) | |
| *B64C 25/62* | (2006.01) | |
| *B64C 25/12* | (2006.01) | |
| *B64C 25/26* | (2006.01) | |
| *B64C 25/10* | (2006.01) | |
| *F16F 13/00* | (2006.01) | |
| *F16F 1/02* | (2006.01) | |

(52) U.S. Cl.
CPC .............. *B64C 25/22* (2013.01); *B64C 25/10* (2013.01); *B64C 25/12* (2013.01); *B64C 25/26* (2013.01); *B64C 25/62* (2013.01); *F16F 1/027* (2013.01); *F16F 13/00* (2013.01); *F16F 1/025* (2013.01)

(58) Field of Classification Search
CPC ......... B64C 11/38; B64C 25/22; F16D 49/14; F16J 3/02; F15B 15/10; F15B 15/103
See application file for complete search history.

(56) References Cited

U.S. PATENT DOCUMENTS 6,901,840 B1 *   6/2005  Yatsko .................. F15B 15/103
                                                               91/1
2016/0272303 A1 *  9/2016  Schmidt .................. B64C 25/58

FOREIGN PATENT DOCUMENTS

| EP | 3069991 A1 | 9/2016 |
|---|---|---|
| GB | 2495999 A | 5/2013 |

OTHER PUBLICATIONS

Extended European Search Report for European Application No. 17 208 258.8, dated Jun. 25, 2018—7 pages.

* cited by examiner

*Primary Examiner* — Joshua J Michener
*Assistant Examiner* — Ashesh Dangol
(74) *Attorney, Agent, or Firm* — RatnerPrestia

(57) ABSTRACT

An aircraft landing gear assembly includes a bi-stable, split line tube biased to assume a tubular condition to serve in place of a lock link or side stay and a flexible vessel actuator configured to radially enlarge the tube at a region for folding.

24 Claims, 4 Drawing Sheets

AIRCRAFT LANDING GEAR ASSEMBLY

This application claims the benefit of and priority to European Application EP17208258.8, filed on Dec. 18, 2017, the contents of which are incorporated herein by reference.

BACKGROUND TO THE INVENTION

An aircraft landing gear assembly is generally movable between a deployed condition for take-off and landing, and a stowed condition for flight.

An actuator is provided for moving the landing gear between the deployed condition and the stowed condition. This actuator is known in the art as a retraction actuator, and more than one can be provided. A retraction actuator may have one end coupled to the airframe and another end coupled to the main strut such that extension and retraction of the actuator results in movement of the main strut between deployed and stowed conditions.

A brace or stay is generally provided to support the orientation of the main fitting when the landing gear is in the deployed condition. A stay generally includes a two bar linkage that can be unfolded to assume a generally aligned, over center condition in which the stay is locked to inhibit movement of the main fitting. When the stay is broken, it no longer reacts movement of the main fitting and the main fitting can be moved by the retraction actuator to the stowed condition. Some main landing gear assemblies include a pair of stays coupled to a common main fitting.

A lock link is generally provided in conjunction with each stay to maintain the stay in the locked condition. A lock link generally includes a two bar linkage that can be unfolded to assume a locked over center condition to inhibit movement of the stay. The lock link must be broken to enable the stay to be folded, thereby permitting the main fitting to be moved by the retraction actuator towards the stowed condition.

The present inventor has devised a new type of landing gear assembly that can be lighter and/or simpler in comparison to known landing gear assemblies.

SUMMARY OF INVENTION

According to a first aspect of the invention there is provided an aircraft landing gear assembly comprising: a main strut arranged to be movably coupled to an aircraft so as to be movable between a deployed condition, for take-off and landing, and a stowed condition for flight; a support linkage coupled at a first anchor point to the main strut and having a second anchor point arranged to be coupled to the aircraft, the support linkage having a locked condition in which it is arranged to inhibit movement of the main strut from the deployed condition in one or more planes of movement and an unlocked condition in which it permits the main strut to move from the deployed condition to the retracted condition, the support linkage comprising a split tube spring having a longitudinal axis and a longitudinal slot, the split tube spring being biased to assume a tubular condition in which it can react axial loading thereof, the support linkage being in the locked condition when the split tube spring is in the tubular condition and being in the unlocked condition when the split tube spring is in a folded condition; and an actuator operable to radially enlarge a region of the split tube spring for the split tube spring to fold at the radially enlarged region to assume the folded condition, the actuator comprising a flexible vessel arranged to be coupled to a source of pressurizing fluid via a fluid port, the flexible vessel comprising a flexible first portion which extends transverse with respect to the longitudinal axis of the split tube spring such that when pressuring fluid is introduced into the flexible vessel the flexible portion straightens to radially enlarge the region of the split tube spring to permit the split tube spring to assume the folded condition.

Thus, the landing gear assembly according to aspects of the invention includes a tubular spring having a longitudinal slot, such as a bi-stable split line tube, which can replace a conventional lock link to lock a stay in its aligned condition, or can replace the stay and lock link to directly maintain the strut in the deployed condition. Importantly, the landing gear assembly of the first aspect also includes an actuator in the form of a flexible vessel that can fold with the tube when the tube is in the tubular condition and which includes a lateral, flexible first portion or gallery which straightens due to an increase in internal fluid pressure. Thus, the pressurized first portion straightens to radially enlarge the split tube spring for folding. The actuator is advantageous over known actuators, which can introduce a significant number of pin joints, increase the weight, complexity and/or can cause the envelope of the landing gear assembly to increase during actuation. The landing gear according to the first aspect can have fewer individual pieces, reducing associated wear effects thereby increasing reliability and reducing maintenance.

The flexible vessel can be arranged such that it substantially does not distend or stretch when pressurized to cause the flexible portion to assume the straight condition. In such embodiments the flexible vessel can be formed from a flexible material such as rubber but with walls of a thickness such that operational fluid pressure is insufficient to cause the rubber to distend or stretch by more than 1% for example. Such arrangements can be advantageous in that they can limit the operational envelope of the landing gear assembly and/or the flexible vessel can, in use, be effectively shielded by the split tube spring.

At least the flexible first portion of the flexible vessel can be disposed on the inside face of the tube, and optionally all of the flexible vessel can be disposed on the inside face of the tube. An advantage to these arrangements is that the flexible vessel can, in use, be shielded by the split tube.

Alternatively, the split tube spring can be formed of at least first and second layers and at least the flexible first portion can be disposed between first and second layers, and optionally all of the flexible vessel can be disposed between first and second layers. An advantage of these arrangements is that the flexible vessel can, in use, be shielded by the split tube spring when in the locked and unlocked conditions.

The landing gear assembly can further comprise a source of pressured fluid coupled to the fluid port. The source of pressured fluid can comprise a pneumatic supply or a hydraulic supply.

Where the source of pressured fluid is a hydraulic supply, the flexible vessel can comprise a hydraulic hose. This can help to protect the split tube spring from corrosive hydraulic fluid such as a phosphate ester base fluid.

The first anchor point can be directly coupled to the main strut.

The second anchor point can be directly coupled to the aircraft.

The main strut can comprise a shock absorbing strut.

The split tube spring can be elongate.

The split tube spring can be a bi-stable tube.

The longitudinal slot can extend along the full length of the split tube spring.

The split tube spring can be formed from metal or a fiber composite material.

The ends of the split tube spring can be coupled to components of the landing gear assembly by fittings which hold the ends of the tube in the tubular condition.

The end fittings of the tube spring can be rigid. In some embodiments the end fittings can each be longer than the split tube spring, such that the spring defines a flexible elbow region in an otherwise rigid linkage, which can be advantageous when the spring is formed from a fiber composite material; in such embodiments the fittings and spring can be integrally formed, with the fiber layup in the fittings being arranged to define rigid portions and the layup in the spring portion be arranged to define a split tube spring having a longitudinal slot, the spring being biased to assume a tubular condition and being foldable, such as a bi-stable spring. The tube spring can therefore be a rigid tube having a central portion which is short in comparison to the length of the tube, the central portion including a longitudinal slot and having bi-stable properties. Alternatively, the fittings can each be shorter than the spring, which can be advantageous if the spring is formed from metal; the fittings can each be less than ⅒ of the length of the spring such that the spring defines most of the linkage.

The support linkage can include a folding stay arm which defines the first and second anchor points, a first end of the split tube spring being coupled to the stay and a second end of the split tube spring being coupled to another part of the landing gear assembly, such as the main fitting of the main strut. In such embodiments, the end fittings of the split tube spring can be pivotally coupled to the specified parts of the landing gear assembly.

Alternatively, the end fittings of the split tube spring can define the first and second anchor points such that the split tube spring directly replaces the stay of a conventional landing gear assembly. In such embodiments the end fittings, which define the anchor points, can be rigidly coupled respectively to the main strut and airframe.

The split tube spring can be held within the end fittings such that split line of the split tube spring is orientated towards the main strut or the aircraft such that the split tube spring will fold during retraction of the gear into the assembly.

The landing gear assembly can include a second split tube spring having a longitudinal slot, the spring being coupled at a third anchor point to the main strut and having a fourth anchor point arranged to be coupled to the aircraft, the split tube spring having a tubular condition in which it is arranged to inhibit movement of the main strut from the deployed condition in a plane of movement and an unlocked, folded condition in which it permits the main strut to move from the deployed condition to the retracted condition, the landing gear assembly further including a second actuator operable to radially enlarge a region of the second tube for the second tube to fold at the enlarged region.

In such an embodiment, the first and second split tube springs can be held within their end fittings such that their split lines are orientated away from one another when the tubes are in the tubular conditions, such that the tubes do not contact one another during retraction of the landing gear.

According to a second aspect of the invention, there is provided an aircraft landing gear assembly including a split tube spring having a longitudinal slot, the spring being coupled to a foldable stay arm and being biased to assume a tubular condition in which it can react axial loading thereof, and an actuator operable to radially enlarge a region of the tube for the tube to fold at the enlarged region, wherein the split tube spring is configured to lock the stay arm in a generally aligned condition when it is in the tubular condition and is configured to permit folding of the stay arm when it is folded, the actuator comprising a flexible vessel arranged to be coupled to a source of pressurizing fluid via a fluid port, the flexible vessel comprising a flexible first portion which extends transverse with respect to the longitudinal axis of the split tube spring such that when pressuring fluid is introduced into the flexible vessel the flexible portion straightens to create the radially enlarged region of the split tube spring for the split tube spring to fold at the radially enlarged region.

According to a third aspect of the invention, there is provided an aircraft landing gear assembly including a split tube spring having a longitudinal slot, the spring being coupled at a first anchor point to the landing gear assembly and having a second anchor point arranged to be coupled to the aircraft, the split tube spring being biased to assume a tubular condition in which it can react axial loading thereof, and an actuator operable to radially enlarge a region of the tube for the tube to fold at the enlarged region, wherein the split tube spring is configured in the tubular condition to inhibit movement of the landing gear assembly from a deployed condition to a retracted condition and configured to permit such movement when folded, the actuator comprising a flexible vessel arranged to be coupled to a source of pressurizing fluid via a fluid port, the flexible vessel comprising a flexible first portion which extends transverse with respect to the longitudinal axis of the split tube spring such that when pressuring fluid is introduced into the flexible vessel the flexible portion straightens to create the radially enlarged region of the split tube spring for the split tube spring to fold at the radially enlarged region.

Optional features of the assembly according to the first aspect can be applied to the assemblies of the second and third aspects in an analogous fashion.

According to a fourth aspect of the invention, there is provided an aircraft including one or more landing gear assemblies according to earlier aspects of the invention.

BRIEF DESCRIPTION OF THE DRAWINGS

Embodiments of the invention will now be described, strictly by way of example only, with reference to the accompanying drawings, of which.

DESCRIPTION OF THE EMBODIMENTS

As an overview, embodiments of the invention relate to an aircraft landing gear assembly which includes a tubular spring having a longitudinal slot which is biased to assume a tubular condition to serve in place of a lock link or side stay and an actuator in the form of a flexible vessel configured to radially enlarge the tube at a region for folding due to increased fluid pressure within a first portion of the flexible vessel.

Figure 1:
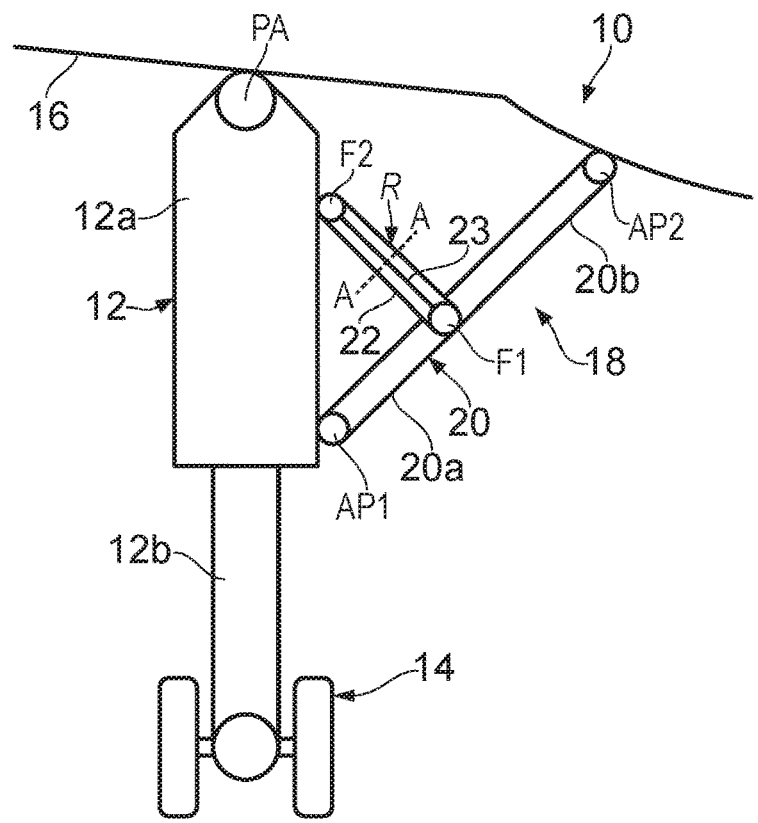
FIG. 1 is a diagram of a landing gear assembly according to an embodiment of the invention.

Referring first to FIG. 1, part of an aircraft, namely an aircraft landing gear assembly, is shown generally at 10.

The landing gear assembly 2 includes a main strut 12 having a main fitting 12a arranged to be movably coupled to an aircraft 16 and a telescoping slider 12b slidably coupled to the main fitting 12a and having a lower free end which carries any suitable wheel assembly 14. The main strut 12 is movable by a retraction actuator (not shown) between a deployed condition for take-off and landing, and a stowed condition for flight.

A support linkage 18 is coupled at a first anchor point AP1 to the main strut 12 and has a second anchor point AP2 arranged to be coupled to the aircraft 16. The support linkage 18 includes a conventional folding stay 20 consisting of a pair of hinged arms 20a, 20b the free ends of which define the first and second anchor points AP1, AP2. The support linkage 18 has a locked condition in which it is arranged to inhibit movement of the main strut 12 from the illustrated deployed condition in a plane of movement orthogonal to the plane within PA of the strut, and an unlocked condition in which stay arm 20 folds to permits the main strut 12 to move from the deployed condition to the retracted condition.

Figure 2A:
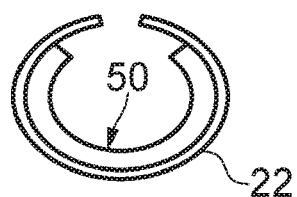
FIGS. 2a to 2c are diagrams of the split tube spring through section A-A in a tubular condition, a radially enlarged condition and a flat condition respectively.
Figure 2B:
Figure 2C:
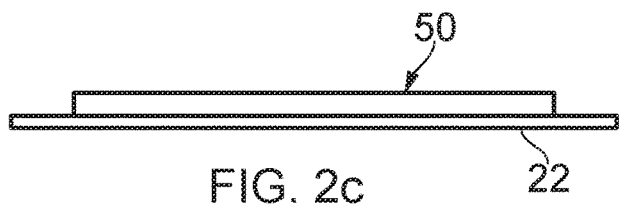

Referring additionally to FIGS. 2a to 2c, the support linkage 18 also includes a bi-stable split line tube 22 biased to assume a tubular condition, as illustrated in FIG. 2a through section A-A of FIG. 1, in which the tube can react axial loading thereof. As will be appreciated by the skilled person, a bi-stable tube is a length of flexible material which can adopt a stable extended or tubular shape, as shown in FIG. 2a, in addition to a stable coiled state in which the section through A-A of FIG. 1 is substantially flat as shown in FIG. 2c. Bi-stable tubes can be formed from various materials such as metal or fiber composite.

A first end of the split tube spring 22 defines a fitting F1 coupled to the stay 20. A second end of the split tube spring 22 defines a second fitting F2 coupled to another part of the landing gear assembly 10, such as the main fitting 12a of the main strut 12. The end fittings F1, F2 of the split tube spring 22 are pivotally coupled to the specified parts of the landing gear assembly to allow the fittings F1, F2 to pivot about axes which are orthogonal to the plane of the page and the longitudinal axis of the tube 22.

When in the tubular condition, the split tube spring 22 serves to lock the stay arm 20 in the aligned condition in which it is arranged to inhibit movement of the main strut 12 from the illustrated deployed condition. Thus, the support linkage 18 is the locked condition when the tube 22 is in the tubular condition.

Figure 3A:
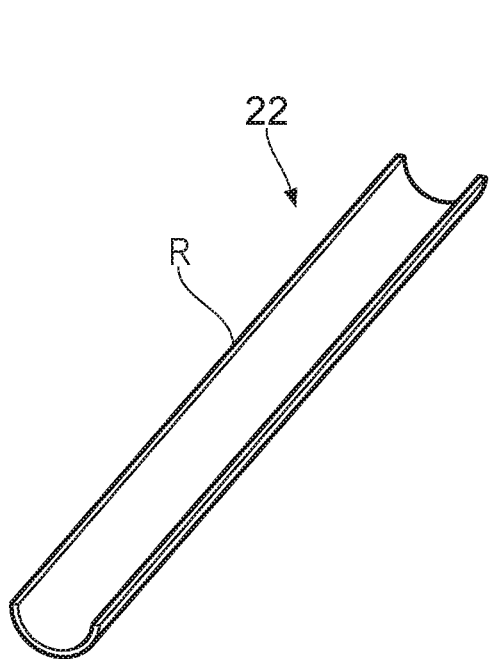
FIGS. 3a and 3b are diagrams of the split tube spring in locked and unlocked conditions respectively.
Figure 3B:
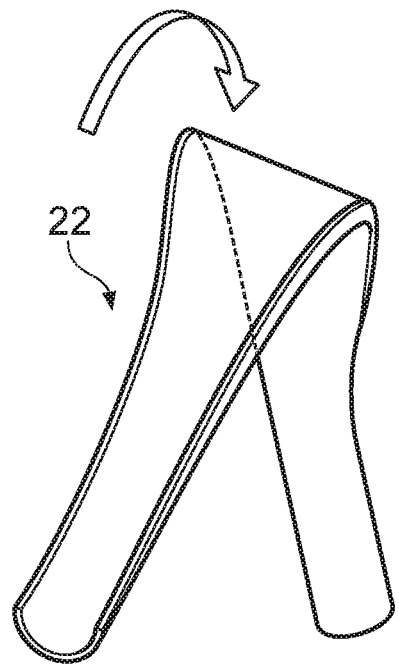

As the split tube spring 22 will fold preferentially wherever it is flattened, an unlocking facility is provided by an actuator 50 operable to radially enlarge a region R of the tube 22 for the tube 22 to fold at the enlarged region R. As illustrated in FIG. 2b, the actuator 50 has moved from a flexed condition to adopt a straighter condition to unwind the coil such that the tube 22 is almost flat. As illustrated in FIG. 2c, the actuator 50 is flat and the tube 22 is flat, ready to be folded from the condition illustrated in FIG. 3a to the condition illustrated in FIG. 3b (parts other than the tube are omitted for clarity). The folding can be actioned by the stay arm 22 attempting to move out of the aligned condition and thereafter by the retraction actuator. Thus, the support linkage 18 is in the unlocked condition when the tube 22 is folded.

The landing gear assembly 10 of the illustrated embodiment requires no additional lock link, as the split tube spring 22 performs this function when in the tubular condition, and moreover there is no requirement for a down lock spring because the split tube spring 22 itself provides the energy to move towards and 'lock' into the tubular condition.

Figure 4A:
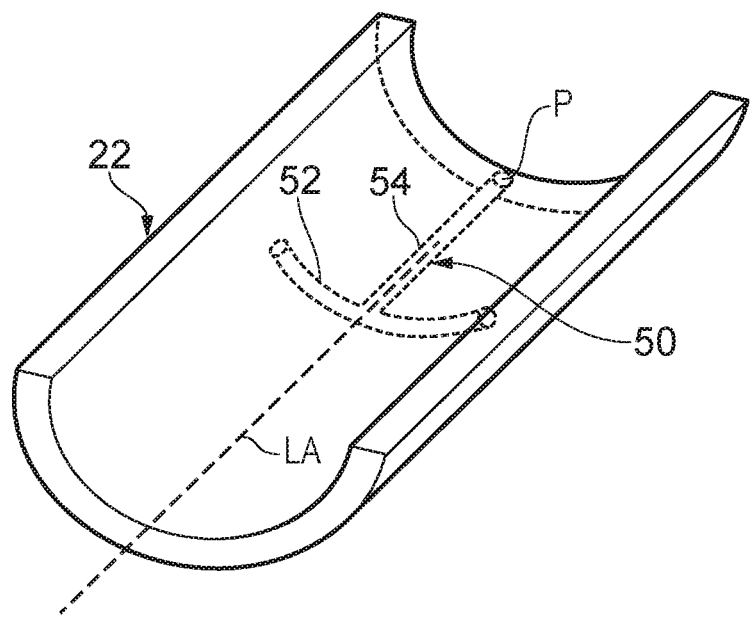
FIG. 4a is a diagram of the split tube spring showing the flexible vessel actuator in relatively low pressure, flexed condition when the split tube spring is in the locked condition.
Figure 4B:
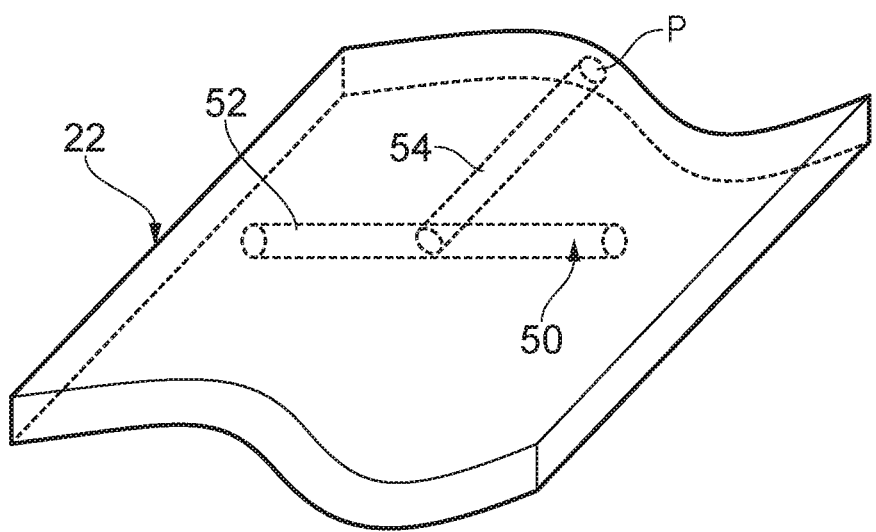
FIG. 4b is a diagram of the split tube spring showing the flexible vessel actuator in a relatively high pressure, straight condition putting the split tube spring in the unlocked condition.

FIGS. 4a and 4b show the actuator 50 in more detail. The actuator 50 is a flexible vessel 50 including a port P arranged to be coupled to a source of pressurized fluid (not shown) such as a pneumatic supply or a hydraulic supply. Thus, fluid can be supplied to the flexible vessel 50 to change it from a relatively low pressure, flexible condition as shown in FIG. 4a to a relatively high pressure, rigid condition as shown in FIG. 4b.

The flexible vessel 50 according to the illustrated embodiment is generally T shaped, including a flexible first portion 52 which extends transverse with respect to the longitudinal axis LA of the split tube spring 22. The first portion 52 is arranged, in use, to cause the radial enlargement of the tube 22 by straightening under internal fluid pressure, as illustrated in FIGS. 2a to 2c. The first portion 52 is coupled to the port P by a generally straight supply conduit 54, which can also be flexible, and extends from the first portion 52 in a generally orthogonal manner along the longitudinal axis LA. The first portion 52 extends across the split spring tube 22 at roughly 90° to the longitudinal axis LA, but can or in other embodiments extend at an angle of between 45° and 135° for example. In further embodiments the first portion 52 and conduit 54 can take any suitable shape or shapes that cause the spring 22 to flatten laterally at region R when pressurized, such as a plurality of parallel tubes or an ellipse for example.

The flexible vessel 50 can be formed from any suitable material, such as rubber or other material suitable for use with pressurized aircraft hydraulic fluids. Where the source of pressured fluid is a hydraulic supply, elements of the flexible vessel can comprise a hydraulic hose. This can help to protect the split tube spring from corrosive hydraulic fluid such as a phosphate ester base fluid.

The flexible vessel 50 can be arranged such that it substantially does not distend or stretch considerably when being pressurized to cause the flexible portion 52 to assume the straight condition. Put another way, although the flexible vessel 50 is sufficiently flexible to be flexed from the straight condition as shown in FIGS. 2c and 4b to the flexed or bent condition as shown FIGS. 2a and 4a, the flexible vessel 50 can be arranged such that operational fluid pressure is insufficient to cause the flexible vessel 50 to distend by more than, say, 5% and preferably by no more than 1%. In such embodiments the flexible vessel can be formed from a flexible material such as rubber with walls of a thickness sufficient to inhibit considerable stretching. Suitable thicknesses can easily be determined for a particular material though routine testing. Such arrangements advantageously enable the flexible vessel 50 to serve as an unlock actuator while having a substantially constant volume and therefore size.

In the illustrated embodiment the flexible vessel 50 is mounted on the inside face of the tube 22. The flexible vessel 50 can be mounted by any suitable means such as bonding, strapping or other mechanical fixings. An advantage to these arrangements is that the flexible vessel 50 can, in use, be shielded by the split tube 22 when it is straight, in the locked condition.

Figure 5:
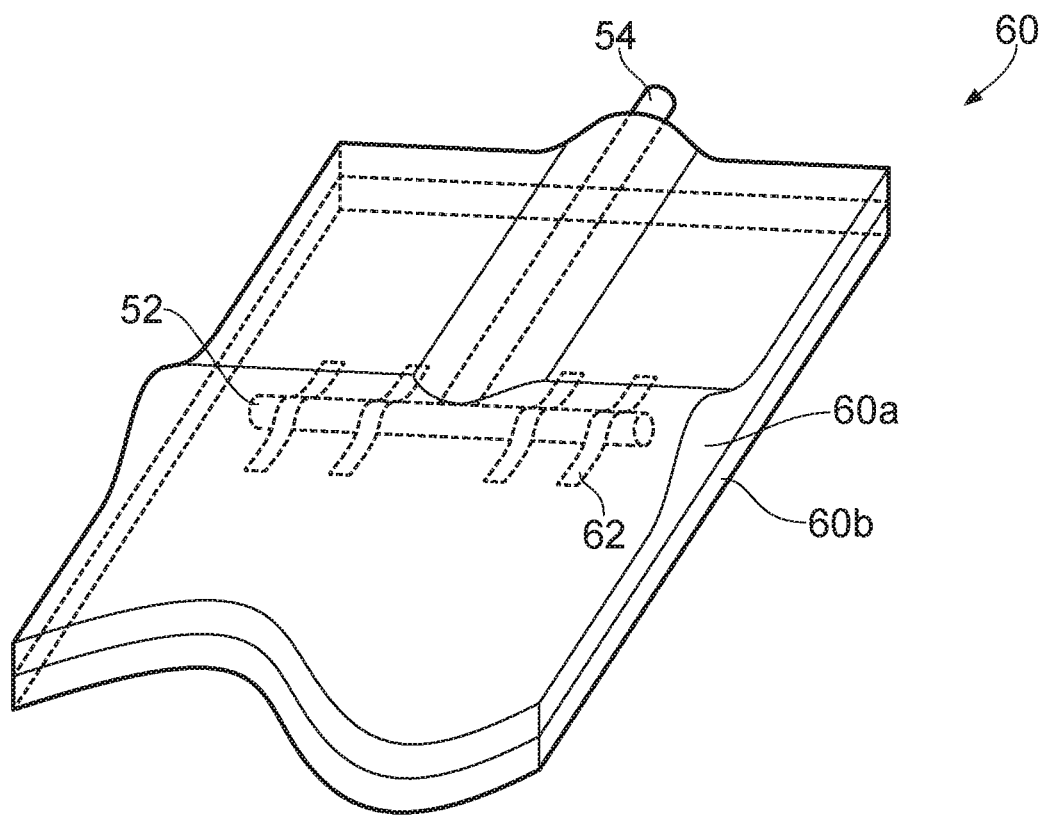
FIG. 5 is a diagram of an alternative split tube spring actuator showing the flexible vessel actuator in relatively high pressure, straight condition putting the split tube spring in the unlocked condition.

Alternatively, and as shown in FIG. 5, the split tube spring 60 can be formed of major first and second layers 60a, 60b. The flexible vessel 50 can be disposed between first and second layers 60a, 60b. The layers can for example be formed from fiber composite. An advantage to these arrangements is that the flexible vessel can, in use, be shielded by the split tube spring when in the locked and unlocked conditions. Parts of the flexible vessel 50 such as the first portion 52 can be affixed to the base layer 60a by straps 62 or the like before the second layer 60b is applied to encapsulate the hoses 52, 54.

Figure 6:
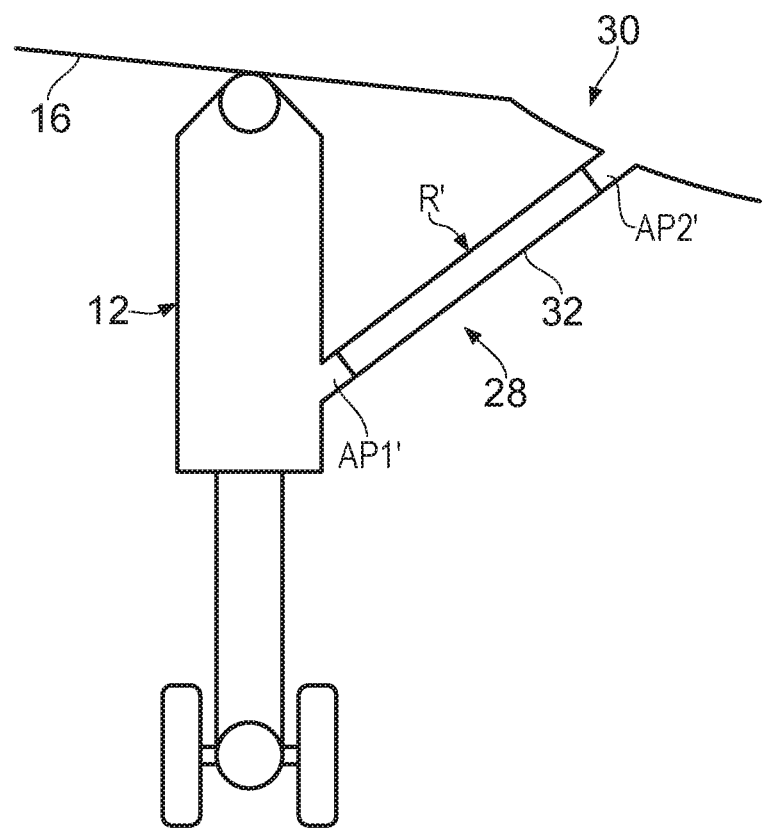
FIG. 6 is a schematic representation of a landing gear assembly according to a further embodiment of the invention.

Referring now to FIG. 6, an aircraft landing gear assembly according to a further embodiment of the invention is shown generally at 30. The landing gear assembly 30 is similar to that 10 of the FIG. 1, and for brevity the following description will focus on the differences.

In the illustrated embodiment, the end fittings of the split tube spring 32 define the first and second anchor points AP1', AP2' such that the split tube spring 32 directly replaces the stay of a conventional landing gear assembly. Thus, the spring 32 defines a side stay 28. The end fittings are rigidly coupled respectively to main strut 12 and airframe 16. A flexible vessel actuator (not shown) such as those described above can be provided for radially enlarging a region R' of the tube 32 such that it can fold at the flattened region.

As will be appreciated, it is common in use for a main landing gear stay to experience loads which are a function of the size of the aircraft and the geometry of the side stay. Side loads at the ground may be on the order of half the vertical load, which could for example be roughly half the weight of the aircraft. Knowing the position of the attachment and the angle of attachment, it is possible to calculate the load in the stay. The skilled person will be capable of using routine compression testing methods to ascertain whether a particular split tube spring is suitable for use in place of a conventional stay arm.

In any embodiment, the split tube spring 22, 32 can be held within its end fittings such that split line, i.e. the gap between longitudinal edges of the tube, can be orientated towards the main strut 12 or the aircraft 16 such that the split tube spring 22, 32 will fold during retraction of the gear in a desired direction. This is advantageous when meeting the stowage requirements for a given aircraft.

Figure 7:
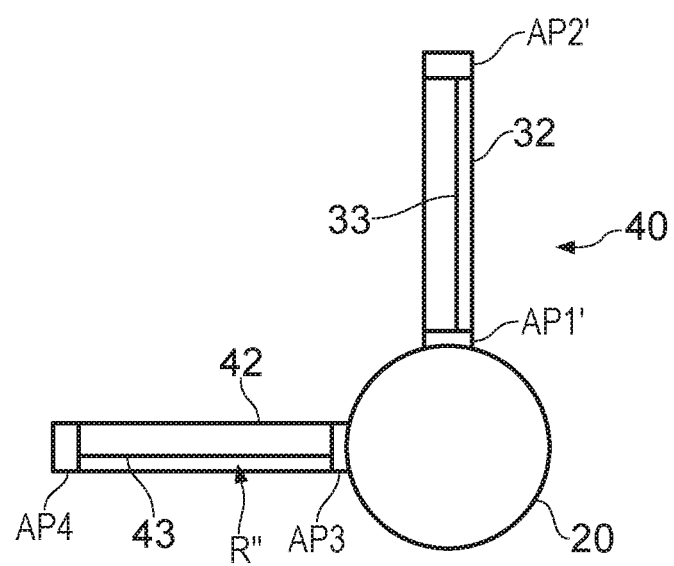
FIG. 7 is a schematic plan view of a landing gear assembly according to a further embodiment of the invention.

Referring now to FIG. 7, an aircraft landing gear assembly according to a further embodiment of the invention is shown generally at 40. The landing gear assembly 40 is similar to that of 30 of the FIG. 6, and for brevity the following description will focus on the differences.

The landing gear assembly 40 includes a second bi-stable split line tube 42 coupled at a third anchor point AP3 to the main strut 12 and having a fourth anchor point AP4 arranged to be coupled to the aircraft. The split tube spring 42 has a tubular, locked condition in which it is arranged to inhibit movement of the main strut 12 from the deployed condition in a plane of movement and an unlocked, folded condition in which it permits the main strut 12 to move from the deployed condition to the retracted condition. The landing gear assembly further includes a second flexible vessel actuator (not shown) operable to radially enlarge a region R" of the second tube 42 for the second tube 42 to fold at the enlarged region R. Thus, the landing gear assembly 40 can include a dual tube arrangement akin to a dual stay arrangement in which, for example, a forward and aft stay can be provided to reduce loading on the aircraft wing.

In such embodiments, the first and second split tube springs 32, 42 can be held within their end fittings such that their split lines 33, 43 are orientated away from one another when the tubes are in the tubular conditions, such that the tubes 32, 42 do not contact one another during retraction of the landing gear assembly 40.

Although in the described embodiments the tube is defined by a bi-stable split line tube, in other embodiments any tubular spring having a longitudinal slot can be used.

The split tube spring according to embodiments of the invention can be formed from any suitable spring material which is biased to assume a tubular or coiled condition in which it can react axial loading thereof, and can be unfolded or radially enlarged to permit the spring to fold; for example, the tube spring can be formed from metal or a fiber composite material.

In any embodiment the end fittings of the tube spring can be rigid. In some embodiments the end fittings can each be longer than the split tube spring, such that the spring defines a flexible elbow region in an otherwise rigid linkage, which can be advantageous when the spring is formed from a fiber composite material; in such embodiments the fittings and spring can be integrally formed, with the fiber layup in the fittings being arranged to define rigid portions and the layup in the spring portion being arranged to define a split tube spring having a longitudinal slot, the spring being biased to assume a tubular condition and being foldable, such as a bi-stable spring. Alternatively, the fittings can each be shorter than the spring, which can be advantageous if the spring is formed from metal; the fittings can each be less than 1/10 of the length of the spring such that the spring defines most of the linkage.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
a main strut arranged to be movably coupled to an aircraft so as to be movable between a deployed condition for take-off and landing, and a stowed condition for flight;
a support linkage coupled at a first anchor point to the main strut and having a second anchor point arranged to be coupled to the aircraft, the support linkage having a locked condition in which it is arranged to inhibit movement of the main strut from the deployed condition in one or more planes of movement and an unlocked condition in which it permits the main strut to move from the deployed condition to the retracted condition, the support linkage comprising a split tube spring having a longitudinal axis and a longitudinal slot, the split tube spring being biased to assume a tubular condition in which it can react axial loading thereof, the support linkage being in the locked condition when the split tube spring is in the tubular condition and being in the unlocked condition when the split tube spring is in a folded condition; and an actuator operable to radially enlarge a region of the split tube spring for the split tube spring to fold at the radially enlarged region to assume the folded condition, the actuator comprising a flexible vessel arranged to be coupled to a source of pressurising fluid via a fluid port, the flexible vessel comprising a flexible first portion which extends transverse with respect to the longitudinal axis of the split tube spring, from a first end of the flexible first portion to a second end of the flexible first portion, such that when pressuring fluid is introduced into the flexible vessel the flexible first portion straightens to radially enlarge the region of the split tube spring to permit the split tube spring to assume the folded condition;

wherein the flexible vessel further comprises a flexible supply conduit which extends along the split tube to fluidly couple the flexible first portion to the port for introducing the pressuring fluid into the flexible vessel, and wherein the supply conduit is fluidly connected to the flexible first portion between the first end of the flexible first portion and the second end of the flexible first portion.

2. An aircraft landing gear assembly according to claim 1, wherein the flexible vessel is arranged such that it substantially does not distend or stretch when pressurised to cause the flexible portion to assume the straight condition.

3. An aircraft landing gear assembly according to claim 1, wherein at least the flexible first portion of the flexible vessel is disposed on the inside face of the tube.

4. An aircraft landing gear assembly according to claim 1, wherein the split tube spring is formed of at least first and second layers and at least the flexible first portion is disposed between first and second layers.

5. An aircraft landing gear assembly according to claim 1, further comprising a source of pressured fluid coupled to the fluid port.

6. An aircraft landing gear assembly according to claim 5, wherein the source of pressured fluid is a hydraulic supply and the flexible vessel comprises a hydraulic hose.

7. An aircraft landing gear assembly according to claim 1, wherein the ends of the split tube spring are coupled to components of the landing gear assembly by fittings which hold the ends of the tube in the tubular condition.

8. An aircraft landing gear assembly according to claim 7, wherein the end fittings of the tube spring are rigid.

9. An aircraft landing gear assembly according to claim 8, wherein the end fittings are longer than the length of the split tube spring when in the tubular condition, such that the spring defines a relatively short flexible elbow region between the rigid fittings.

10. An aircraft landing gear assembly according to claim 8, wherein the end fittings are shorter than the length of the split tube spring when in the tubular condition.

11. An aircraft landing gear assembly according to claim 8, wherein the support linkage includes a folding stay arm which defines the first and second anchor points, a first end of the split tube spring being coupled to the stay and a second end of the split tube spring being coupled to another part of the landing gear assembly.

12. An aircraft landing gear assembly according to claim 11, wherein the end fittings of the split tube spring are pivotally coupled to the specified parts of the landing gear assembly.

13. An aircraft landing gear assembly according to claim 1, wherein the end fittings of the split tube spring define the first and second anchor points.

14. An aircraft landing gear assembly according to claim 13, wherein the end fittings are rigidly coupled to main strut and airframe respectively.

15. An aircraft including one or more aircraft landing gear assemblies, each aircraft landing gear assembly comprising:
a main strut arranged to be movably coupled to an aircraft so as to be movable between a deployed condition for take-off and landing, and a stowed condition for flight;
a support linkage coupled at a first anchor point to the main strut and having a second anchor point arranged to be coupled to the aircraft, the support linkage having a locked condition in which it is arranged to inhibit movement of the main strut from the deployed condition in one or more planes of movement and an unlocked condition in which it permits the main strut to move from the deployed condition to the retracted condition, the support linkage comprising a split tube spring having a longitudinal axis and a longitudinal slot, the split tube spring being biased to assume a tubular condition in which it can react axial loading thereof, the support linkage being in the locked condition when the split tube spring is in the tubular condition and being in the unlocked condition when the split tube spring is in a folded condition; and an actuator operable to radially enlarge a region of the split tube spring for the split tube spring to fold at the radially enlarged region to assume the folded condition, the actuator comprising a flexible vessel arranged to be coupled to a source of pressurising fluid via a fluid port, the flexible vessel comprising a flexible first portion which extends transverse with respect to the longitudinal axis of the split tube spring, from a first end of the flexible first portion to a second end of the flexible first portion, such that when pressuring fluid is introduced into the flexible vessel the flexible first portion straightens to radially enlarge the region of the split tube spring to permit the split tube spring to assume the folded condition;

wherein the flexible vessel further comprises a flexible supply conduit which extends along the split tube to fluidly couple the flexible first portion to the port for introducing the pressuring fluid into the flexible vessel, and wherein the supply conduit is fluidly connected to the flexible first portion between the first end of the flexible first portion and the second end of the flexible first portion.

16. An aircraft landing gear assembly comprising:
a main strut arranged to be movably coupled to an aircraft so as to be movable between a deployed condition for take-off and landing, and a stowed condition for flight;
a support linkage coupled at a first anchor point to the main strut and having a second anchor point arranged to be coupled to the aircraft, the support linkage having a locked condition in which it is arranged to inhibit movement of the main strut from the deployed condition in one or more planes of movement and an unlocked condition in which it permits the main strut to move from the deployed condition to the retracted condition, the support linkage comprising a split tube spring having a longitudinal axis and a longitudinal slot, the split tube spring being biased to assume a tubular condition in which it can react axial loading thereof, the support linkage being in the locked condition when the split tube spring is in the tubular condition and being in the unlocked condition when the split tube spring is in a folded condition; and an actuator operable to radially enlarge a region of the split tube spring for the split tube spring to fold at the radially enlarged region to assume the folded condition, the actuator comprising a flexible vessel arranged to be coupled to a source of pressurising fluid via a fluid port, the flexible vessel comprising a flexible first portion which extends transverse with respect to the longitudinal axis of the split tube spring such that when pressuring fluid is introduced into the flexible vessel the flexible portion straightens to radially enlarge the region of the split tube spring to permit the split tube spring to assume the folded condition, wherein the split tube spring is formed of at least a first layer and a second layer bonded to the first layer with the flexible first portion disposed between first and second layers.

17. An aircraft landing gear assembly according to claim 1, wherein the flexible supply conduit is disposed in a generally orthogonal manner with respect to the flexible first portion.

18. An aircraft landing gear assembly according to claim 17, wherein the flexible supply conduit is disposed along a central longitudinal axis of the split tube.

19. An aircraft landing gear assembly according to claim 18, wherein the flexible supply conduit and the flexible first portion are each elongate parts of the flexible vessel.

20. An air aircraft landing gear assembly according to claim 18, further comprising one or more straps configured to hold the flexible first portion along an axis transverse to the longitudinal axis of the split tube.

21. An aircraft landing gear assembly according to claim 16, wherein the flexible vessel is arranged such that it substantially does not distend or stretch when pressurised to cause the flexible portion to assume the straight condition.

22. An aircraft landing gear assembly according to claim 1, wherein the supply conduit is enclosed within the split tube when the split tube is in the tubular condition.

23. An aircraft landing gear assembly according to claim 1, wherein:

when the split tube spring is in the tubular condition, the longitudinal slot of the split tube spring is defined between two lateral edges of the split tube spring;

when the split tube spring is in the folded condition, the two lateral edges are spaced from each other transversely with respect to the longitudinal axis of the split tube spring with the longitudinal axis being midway between the two lateral edges; and the flexible supply conduit is fluidly coupled to the flexible first portion at a location that is closer to the longitudinal axis than the lateral edges.

24. An aircraft landing gear assembly according to claim 1, wherein the flexible supply conduit is fluidly coupled to the flexible first portion to form a T-shaped flexible vessel, with the flexible supply conduit parallel to the longitudinal axis, and the flexible first portion perpendicular to the longitudinal axis.

* * * * *